United States Patent [19]
Grigoletti

[11] 4,032,898
[45] June 28, 1977

[54] INTERFACE CONTROL UNIT FOR TRANSFERRING SETS OF CHARACTERS BETWEEN A PERIPHERAL UNIT AND A COMPUTER MEMORY

[75] Inventor: Giorgio Grigoletti, Milan, Italy

[73] Assignee: Ing. C. Olivetti & C., S.p.A., Ivrea (Turin), Italy

[22] Filed: Dec. 10, 1975

[21] Appl. No.: 639,402

[30] Foreign Application Priority Data

Mar. 6, 1975 Italy .............................. 67565/75

[52] U.S. Cl. .............................................. 364/200
[51] Int. Cl.² .......................................... G06F 3/00
[58] Field of Search ................... 340/172.5; 445/1

[56] References Cited

UNITED STATES PATENTS

| 3,432,813 | 3/1969 | Annunzlata | 340/172.5 |
| 3,462,741 | 8/1969 | Bush et al. | 340/172.5 |
| 3,550,133 | 12/1970 | King et al. | 340/172.5 |
| 3,673,576 | 6/1972 | Donaldson | 340/172.5 |
| 3,702,462 | 11/1972 | England | 340/172.5 |
| 3,771,136 | 11/1973 | Heneghan et al. | 340/172.5 |
| 3,801,962 | 4/1974 | Moore et al. | 340/172.5 |

*Primary Examiner*—Mark E. Nusbaum
*Attorney, Agent, or Firm*—Schuyler, Birch, Swindler, McKie & Beckett

[57] ABSTRACT

An interface control unit is included in a digital computer system for controlling the transfer of sets of characters between a main memory and a peripheral unit of the mass storage type. The information is transferred in parallel by the interface control unit at the speed of the main memory, independent of the speed of the mass storage. A buffer memory adapted to store a pair of characters is provided; it alternately operates by writing a first and at the same time by reading a second set. The first character of the burst is always transferred to the memory by the microprocessor and the following by the interface control unit.

5 Claims, 12 Drawing Figures

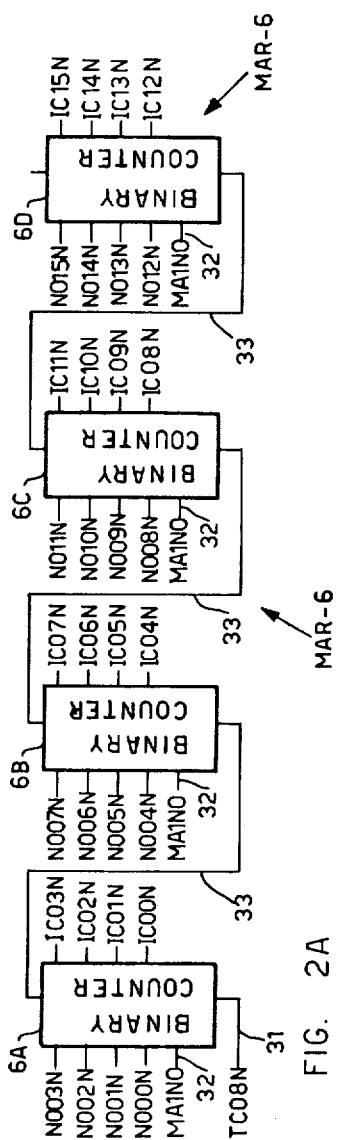
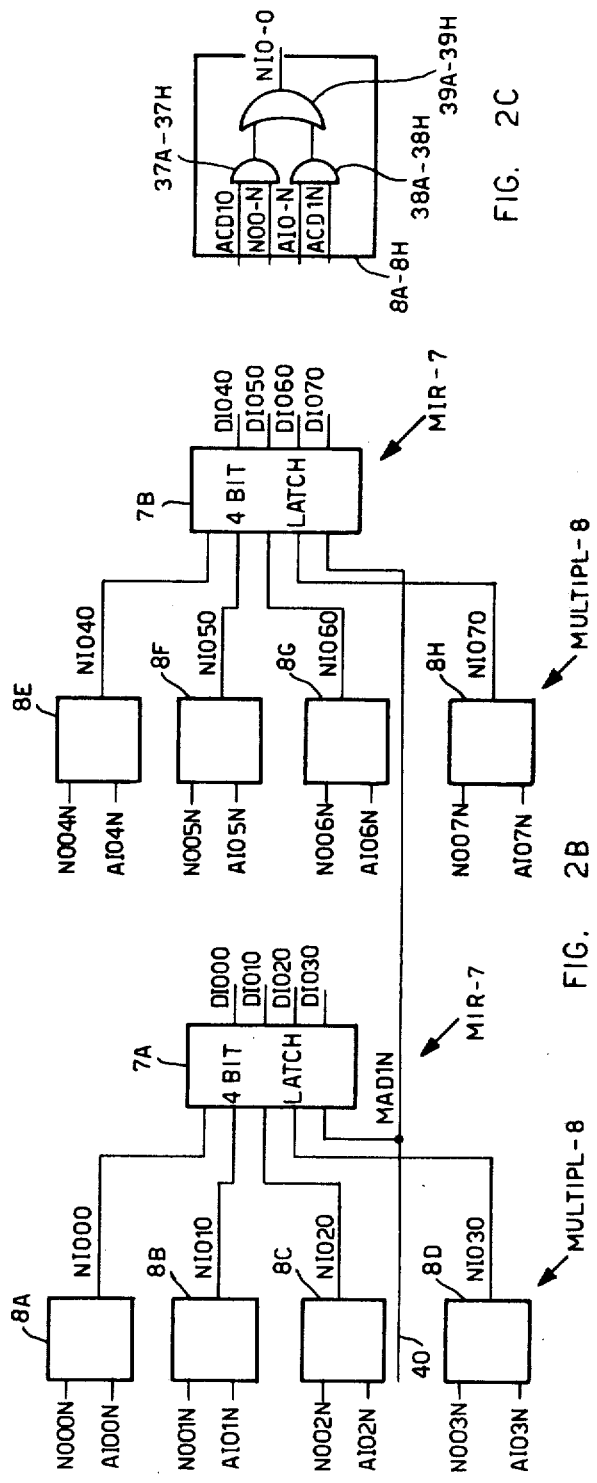
FIG. 2A
FIG. 2B
FIG. 2C

INTERFACE CONTROL UNIT FOR TRANSFERRING SETS OF CHARACTERS BETWEEN A PERIPHERAL UNIT AND A COMPUTER MEMORY

BACKGROUND OF THE INVENTION

1. Field of Invention

The invention relates to an electronic computer capable of exchanging blocks of data (records) between the working memory of the computer and a peripheral unit which performs the functions of a high-capacity external memory, such as, for example, a magnetic disc or drum unit.

2. Description of the Prior Art

An arrangement adapted to transfer blocks of data to (or from) the working memory is known which is bases on the interruption of the program being executed. Generally, this is called direct multiple control (DMC). This arrangement utilizes a control program and a control circuit which are adapted to transfer data from the external memory to the working memory. The central unit has the task of initiating the transfer by indicating to the DMC program the initial and final addresses of the block of data to be transferred. The DMC will interrupt the working of the current program, usually for four machine cycles, whenever the peripheral unit is ready for the transfer of data. At the end of the transfer of each individual word, the central unit resumes execution of the interrupted program. When the transfer of the entire block of data has been completed, a suitable signal provides for inhibiting the DMC from further interrupting the central unit.

The disadvantage of this system is due principally to the slowness of the transfer, inasmuch as at each interrupt there is transferred a single word while four machine cycles are executed. Moreover, during these four cycles, the central unit is given over to the transfer and therefore substantially delays the program being executed.

SUMMARY OF THE INVENTION

The object of this invention is therefore to have an arrangement capable of interrupting the operation of the central unit once only in order to effect the transfer of an entire block of data to or from memory, and of not fully engaging the central unit during the transfer of the entire block.

According to the present invention there is provided an electronic computer, comprising a working memory adapted to contain instructions and data, a central unit adapted to execute the instructions recordered in the memory, a peripheral unit adapted to write and read information on a recording carrier, a control unit adapted to exchange sets of information characters of predefined length between the working memory and the peripheral unit, switching means arranged to command the exchange of the first character of each set through the central unit and of the remaining characters of the set directly between the peripheral unit and the memory.

The invention will be described in more detail, by way of example, with reference to the accompanying drawings.

BRIEF DESCRIPTION OF THE DRAWINGS

FIG. 2a, 2b, 2c show the address register and the register of the data which are input to the memory;

DETAILED DESCRIPTION OF THE INVENTION

Figure 1:
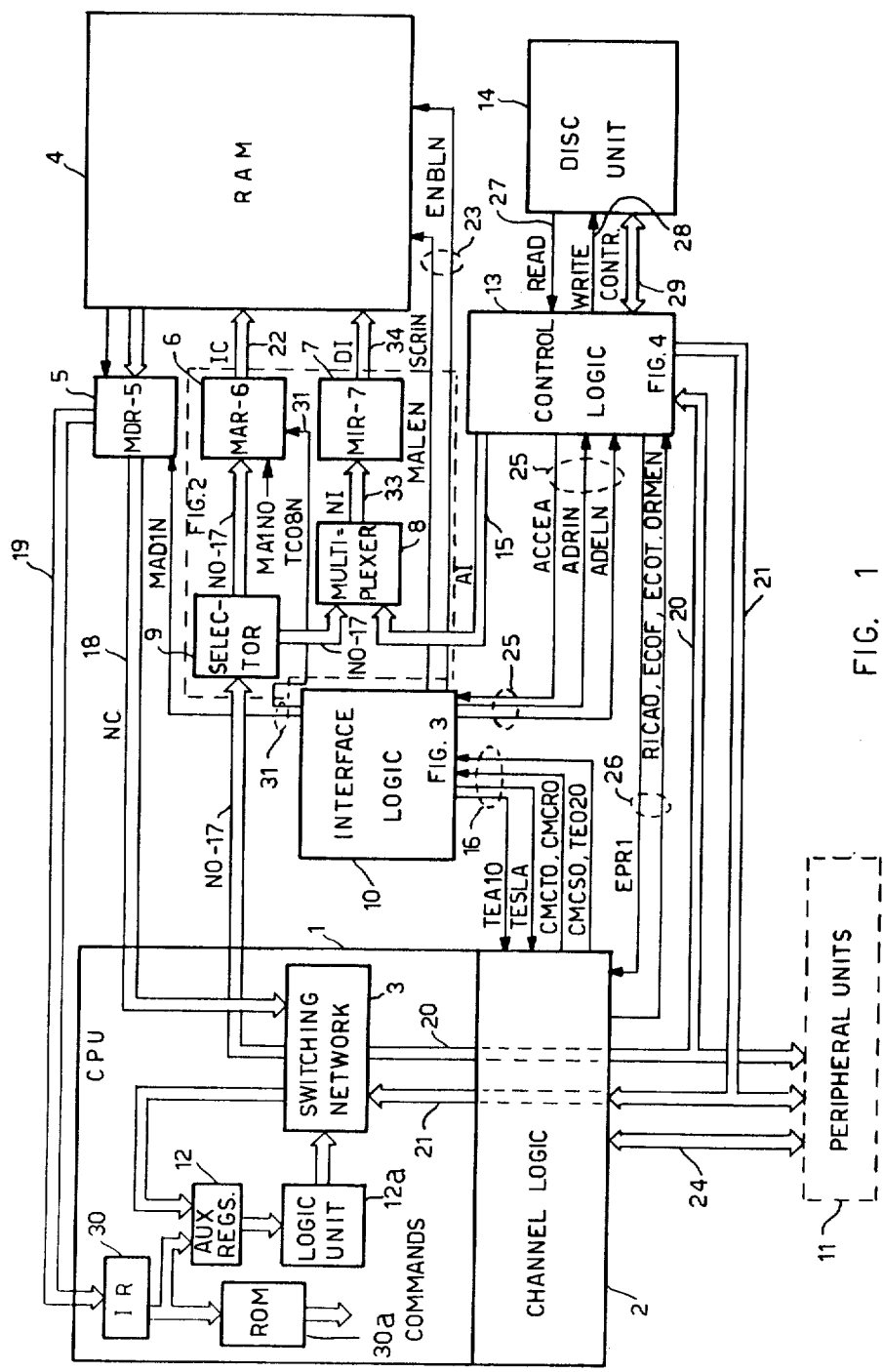
FIG. 1 is a block diagram of a computer embodying the invention.

The functional blocks of a computer employing the arrangement according to the invention will now be described with reference to FIG. 1.

This computer comprises: a central unit or CPU 1 capable of executing the instructions recorded in a working memory or RAM 4 using the technique, known in the art, of microprogramming: that is each instruction of the program to be executed is carried out by a set of microinstructions read from a read-only memory 30a;

a channel logic 2 which comprises the circuits necessary for controlling the exchange of the data between the CPU 1 and a group of peripheral units 11;

an interface logic network 10 adapted to handle the transfer of the blocks of data between the RAM 4 and a control logic unit 13. The control logic unit 13, in turn, is connected to a magnetic-disc peripheral unit 14 to which it supplies, or from which it extracts, the data to be exchanged with the RAM 4.

The operation of the central unit 1 and of the channel logic 2 will not be described inasmuch as they are described in our British Pat. No. 1,334,679 corresponding to the U.S. Pat. Application No. 454,973 that is a continuation-in-part of the application Ser. No. 92,777.

The RAM 4 is a random access read/write memory of any known type, such as, for example, a MOS or magnetic core memory. This memory is addressed by a 16-bit register MAR-6 which is connected to a selector 9. The selector 9 also supplies a multiplexer 8 which, in turn, connects an interface register MIR-7 for holding the data to be written in the memory. The selector 9 is connected through a channel 17 to a switching network 3 forming part of the CPU 1. The switching unit 3 is controlled by the commands generated by the ROM 30 in response to the function code stored into the instruction register 30. The function of the selector is to determine whether bytes from the CPU are treated as data to be stored (via MIR-7) or as addresses to be written into MAR-6. The multiplexer 8 is moreover connected to the control logic unit 13 through a data channel 15. The multiplexer is a multichannel switch which selects as the source of data to be written in the RAM 4 either the control logic 13 or the CPU (via selector 9).

The switching network 3 is connected through a channel 18 to a register MDR-5 for the data read from the RAM 4. The register MDR-5 is connected through a channel 19 to an instruction register (IR) 30 forming part of the CPU 1 and connected to the ROM 30a which issues the machine commands. The network 3 is connected to the peripheral units 11 and to the control logic unit 13 through a channel 20 which transmits the data which is output. A channel 21 connects the peripheral units 11 and the control logic unit 13 to the network 3 for the purpose of introducing into this network 3 the data fed to the CPU 1. It is to be noted that the data carried by the channels 21 and 20 is suitably processed by the channel logic 2 during the conversation with the peripheral units 11 and the control logic unit 13. The channels 24 and 26 connect the peripheral units 11 and the control logic unit 13, respectively, to transmit the commands from and for the channel logic 2. A channel 23 connects the interface logic network 10 to the RAM 4 to transmit the commands relating to the exchanges of data between the disc unit 14 and the RAM 4. A channel 31 connects the interface logic network 10 to the registers MDR-5, MIR-7 and MAR-6 for the purpose of transmitting the signals staticizing the data and addresses, respectively. A channel 16 connects the interface logic network 10 to the CPU 1 for the purpose of receiving and transmitting the commands appertaining to the respective enabling, timing and inhibiting operations. A channel 25 connects the interface logic network 10 to the control logic unit 13 for exchanging the signals relating to direct access to the RAM 4.

Finally, the control logic unit 13 is connected to the disc unit 14 by a lead 27 adapted to transmit the data read serially from the magnetic disc, while a lead 28 transmits the signals to be written on the disc. Finally, a channel 29 transmits the control signals which are exchanged between the control logic unit 13 and the disc unit 14.

The memory addressing register MAR-6 will now be described with reference to FIG. 2a. This register is formed by four four-bit binary counters 6A–6D. The inputs of the counters 6A–6D are formed by lines N000N-N003N, N004N-N007N, N008N-N011N and N012N:N015N, respectively, which constitute the channel 17, while the outputs are IC00N-IC03N, IC04N-IC07N, IC08N-IC11N and IC12N-IC15N, respectively, which constitute the channel 22. The timing input is formed by a line 32 which carries the signal MA1NO coming from the interface logic network 10, while a line included in the channel 31 carries the signal TC08N adapted to increment the current address stored in the register by one. Connections 33 transfer the caries between the four counters. Any address can be forced into the register MAR-6 on the inputs N000N to N015N or addresses can be counted up sequentially using the incrementing input TC08N.

FIG. 2b shows the multiplexer 8 and the register MIR-7 for the data which is input to the memory. The register MIR-7 is formed by two four-bit latch registers 7A and 7B the inputs of which are the signals NI000-NI030 and NI040-NI070, respectively, these inputs forming the channel 33 (FIG. 1), and the respective outputs of which are the signals DI000-DI030 and DI040-DI070, these outputs constituting the channel 34. The writing enabling signal is constituted by the signal MAD1N present on the line 40 and coming from the interface logic network 10. The multiplexer 8 is formed by eight circuits 8A–8H, the logic diagram of which is given in FIG. 2c. Each of these circuits is formed by two AND elements 37 and 38, the outputs of which are connected to an OR element 39. The AND element 37 has as inputs the corresponding signal N00-N coming from the CPU 1 through the channel 17 and a signal ACD10 coming from the interface logic network 10. The AND element 38 has as inputs the corresponding signal AI0-N coming from the control logic unit 13 and constituting access to the memory directly from the disc unit, and the signal ACD1N. The outputs NI000-NI070 of the OR elements 39A–39H constitute the eight inputs of the interface register MIR-7. The result of this is that if the signal ACD10=1, the byte (coming from the CPU 1) present on the channel 17 (N000N-N007N) is recorded in MIR-7, while if ACD10=0 (therefore, ACD1N=1) the byte present on the channel 15 (AI00N-AI07N) and coming from the control logic unit 13 is recorded.

Figure 3:
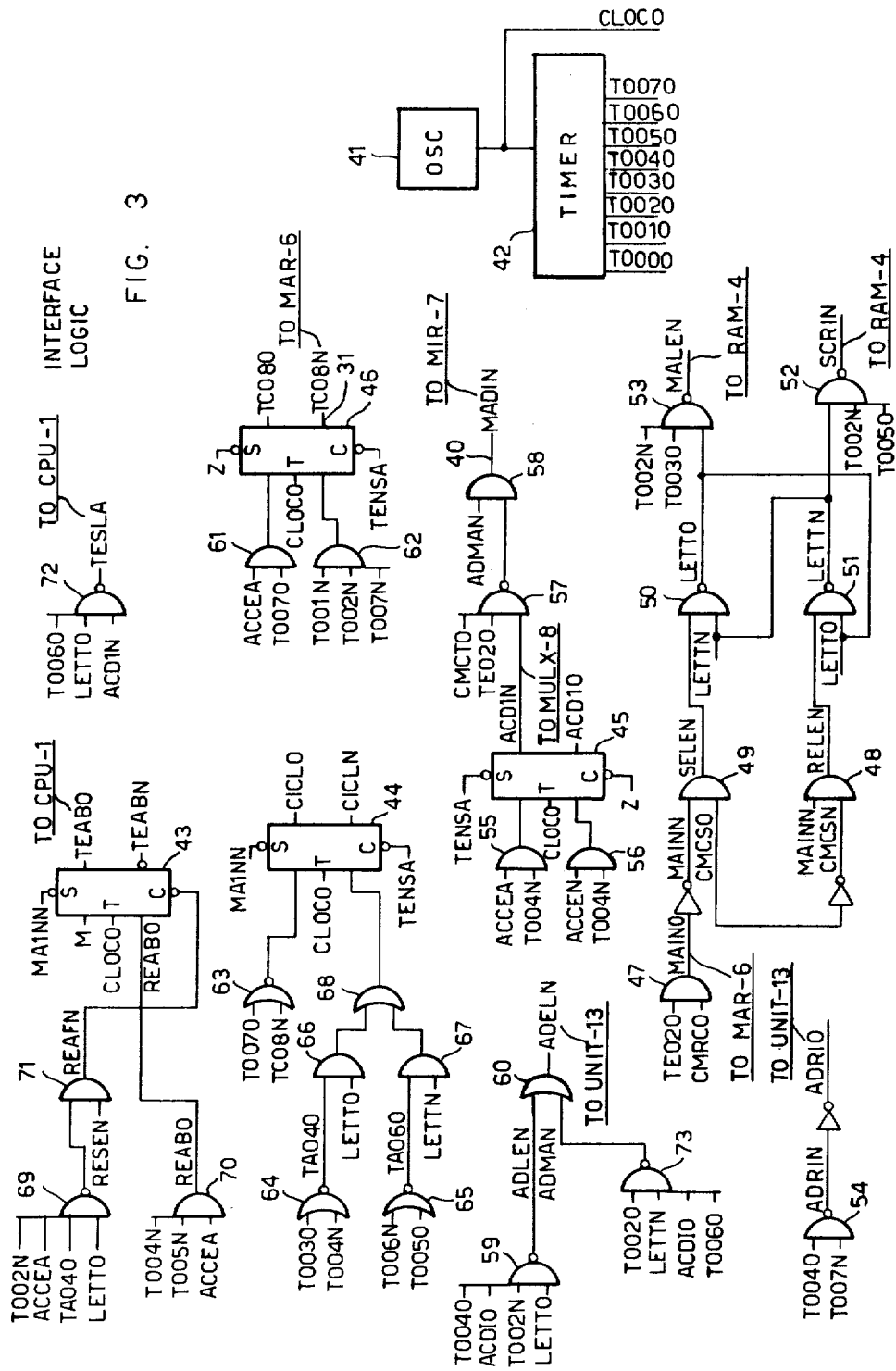
FIG. 3 shows the control circuits adapted to handle the transfer of the data from the memory to the peripheral unit or vice versa.

The logic network 10 which handles the exchange of blocks of characters between the RAM 4 and the control logic unit 13 will now be described with reference to FIG. 3. This network is formed by an oscillator 41 which generates a signal CL0C0 applied to the timing input of flip-flops 43–46; a timer 42 generates eight timing signals T0000-T0070 each of which is delayed with respect to the preceding one by a time equal to one period of the signal CL0C0 (see FIG. 6A). The signals T0000-T0070 and T000N-T007N, which latter are the corresponding negated signals, are applied as input to all those AND, OR and NAND logic circuits whose outputs require to be set at a particular point of the cycle of the RAM 4. The interface logic network 10 receives from the CkPU 1 through the channel 16 the signals TE020, CMRC0, CMCS0 and CMCT0. The signals CMRC0 and TE020 are applied as input to an AND element 47, the output of which MAIN0 is negated (MAINN) and applied as input to an AND element 49 together with the signal CMCS0. The signal MAINN together with the negated form of CMCS0, that is CMCSN, is applied as input to an AND element 48. The outputs SELEN and RELEN of the AND elements 49 and 48, respectively, are applied to one of the inputs of NAND elements 50 and 51. The other input of these NAND elements is constituted by the signal LETTN and LETT0, respectively, so that the result is that the NAND elements 50 and 51 are connected as a flip-flop the set input of which is constituted by the signal SELEN and the reset input is constituted by the signal RELEN, while the outputs are formed by the signals LETT0 and LETTN, respectively. The signal LETT0 together with the signals T002N and T0030 constitutes the input of the NAND element 53, the output of which MALEN is sent to the RAM 4 to command a reading cycle of the memory RAM 4.

The output LETTN of the NAND element 51 is applied as input to a NAND element 52 together with the timing signals T002N and T0050. The output of the NAND element 52 is the signal SCR1N, which is sent to the RAM 4 to command a printing cycle. The signal MA1NO which is output by the AND element 47 is sent to the memory addressing register MAR-6 (FIG. 2A) to staticize therein the NO signals on the channel 17 coming from the CPU 1 together with the signal CMCR0. The signals T0040 and T007N are applied as input to an AND element 54, which generates the signal ADRIN. This signal is negated (ADR10) and is sent to the control logic unit 13 and, if this has previously emitted the signal EPR1, on reception of ADR10 it is prearranged for exchanging blocks of data directly with the RAM 4. After receiving the signal ADR10, the control logic unit 13 emits the signal ACCEA with the significance of a request for direct access. This signal, together with the signal T004N, is applied as input to an AND element 55, while its negated form, also paired with the signal T004N, is applied as input to an AND element 56. The outputs of the AND elements 55 and 56 constitute the SET and RESET inputs, respectively, of the flip-flop 45. The outputs ACD1O and ACD1N of the flip-flop 45 condition the multiplexer 8 (FIG. 2b) to select as data for input to the interface register MIR-7 from among the data present on the NO channel 17 or on the AI channel 15. The signal ACD1N is applied, together with the signals TEO20 and CMCTO, as input to a NAND element 57. The output of the NAND element 57 is applied together with the signal ADMAN to an AND element 58. The output MAD1N of the AND element 58 is carried by the conductor 40 to staticize the data input to the interface register MIR-7 (FIG. 2b) and previously selected by the signal ACD1O.

The signal ACD1O is applied as input, together with the signals LETTO, T002N and T004O, to a NAND element 59, which emits as output the signal ADLEN. A NAND element 73 has the four signals ACD1O, LETTN, T002O and T006O as input and generates the signal ADMAN as output. The signals ADLEN and ADMAN are applied as input to an OR element 60, the output of which is the signal ADELN. This signal is sent to the control logic unit 13 and has the significance, respectively, of end of writing in the RAM 4 in the case of transfer from the disc unit 14 to the RAM 4, or of character read in the case of transfer from the RAM 4 to the disc unit 14. The signal ACCEA from the control logic unit 13 is applied as input, together with the signal T007O, to an AND element 61, the output of which is connected to the SET input of the flip-flop 46. An AND element 62 has the signals T001N, T002N and T007N as inputs and its output is applied to the RESET input of the flip-flop 46. The output TC08N of the flip-flop 46 is applied to the line 31 (FIG. 2a) and is used to increment the memory address in the exchanges of data in direct access. The signals TC08N and T007O are applied as input to a NOR element 63, the output of which constitutes the SET input of the flip-flop 44. The output CICLO of the flip-flop 44 determines the duration of the cycle of the RAM 4, which is lengthened in the case of direct access from the disc unit 14. A NOR element 64 has the signals T003O and T004O as inputs, while a NOR element 65 has the signals T005O and T006N as inputs. The signals LETTO and TAO40, which latter is output by the NOR element 64, are applied to the inputs of an AND element 66. The AND element 67 has the signal LETTN and the signal TAO60 output by the NOR element 65 as inputs. The signals coming as output from the AND elements 66 and 67 are applied as input to the OR element 68. The output of the OR element 68 is applied to the RESET input of the flip-flop 44.

The signals ACCEA, LETTO, T002N and TAO40 are applied as input to an AND element 69, the output of which is applied as input to an AND element 71 together with the general reset signal RESEN coming from the CPU 1. The output REAFN of the AND element 71 is applied to the direct RESET input of the flip-flop 43. The signals ACCEA, T004N and T005N are applied as input to an AND element 70, the output of which REABO is applied to the reset input of the flip-flop 43. The output TEABO of the flip-flop 43 is sent to the CPU 1 and indicates that the memory is executing a reading or writing cycle and therefore indicates that the RAM 4 is engaged. The signals T006O, LETTO and ACD1N are applied as input to a NAND element 72 and supply the signal TESLA as output. This signal is sent to the CPU 1 to indicate that a character read from the RAM 4 is present in the register MDR-5.

Figure 4:
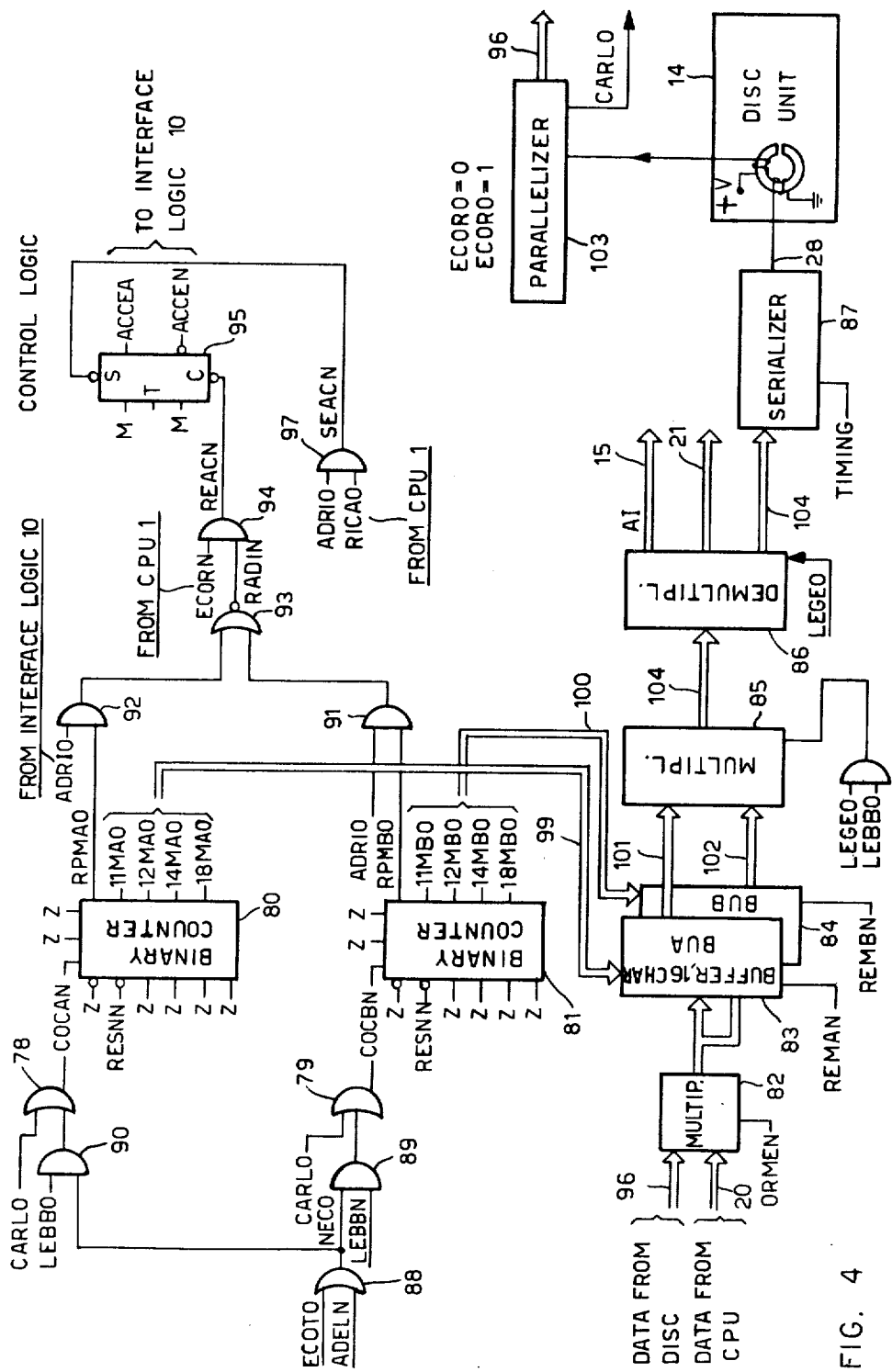
FIG. 4 shows the relevant control circuits for the peripheral unit.

The part of the logic network of the control logic unit 13 which concerns the invention will now be described with reference to FIG. 4.

Two data channels, each with a capacity of eight bits, are the input to a multiplexer 82. The channel 96 is inside the control logic unit 13 and carries the characters coming from a parallelizer 103 which parallelizes the bits read from the disc 14. The channel 20 comes from the CPU 1 and carries the data read from the RAM 4. The signal ORMEN comes from the CPU 1 through the channel 26 and indicates the direction of transfer: ORMEN=1 enables channel 96, ORMEN=0 enables the channel 20. The output of the multiplexer 82 is connected as input to both the sections A and B, 83 and 84 of a storage buffer for the data in transit. Buffer sections 83 and 84 are two random access memories each with a capacity of 16 characters of 8 bits each.

Enabling is effected by the signals REMAN and REMBN, respectively, which, if a logical "1" level, indicate that reading is enabled, while at logical "0" level they enable writing. The address of the cell to be operated on is presented on the channel 99 for A-section 83 and on the channel 100 for the B-section 84. These addresses are generated by binary counters 80 and 81, respectively, the enabling inputs of which are controlled by the signal RESNN, the OR element 88 has the signals ECOT and ADELN as inputs and the signal NECO as output. The presence of the signal NECO indicates that an exchange of characters with the memory is in progress. In fact, ECOT=1 if the exchange takes place through the CPU 1, and this is obtained either during the reading from the RAM 4, or during the writing of the first character in the RAM 4. If, on the other hand, the writing in the RAM 4 does not concern the CPU 1, ADELN=1 will be obtained inasmuch as it is the interface logic network 10 that controls the writing in the RAM 4 of the characters present on the AI channel 15. The signals NECO and LEBBO are applied as input to the AND element 90, the output of which COCAN increments the address generated by the counter 80. The signal LEBBO is generated inside the control logic unit 13 and indicates that the reading of the buffer B-section 84 is in progress. Similarly, the signals LEBBN and NECO are applied as input to the AND element 89, the output of which COCBN increments the address generated by the counter 81 which addresses the cell of the buffer B-stage 84 in which the character is written. The data read alternately from the A-stage 83 or the B-stage 84 is applied as input to a multiplexer 85 which has as selection input the signal LEGRO inside the control logic unit 13. LEGRO=1 selects as input the output channel 102 from the B-stage 84, while LEGRO=0 selects the output channel 101 from the A-stage 83. The output channel 104 from the multiplexer 85 is connected as input to a demultiplexer 86. The output channels from the demultiplexer 86 are the AI channel 15, the channel 21 and a channel 104, which constitutes the input of a serializer 87. The signal LEGEO effects the selection of the output to be activated, that is, LEGEO=0 activates the channel 104 for recording on the disc, while LEGEO=1 activates the channels 15 and 21 for writing in the RAM 4.

The signal ADR1O is sent by the interface logic network 10 to the control logic unit 13 to start an exchange of data controlled by 10 itself. The signal RICAO, on the other hand, comes from the CPU 1 and indicates that the level "1" interrupt request previously sent by the control logic unit 13 has been granted. ADR1O and RICAO are applied as input to an AND element 97, the output of which SEACN is applied to the direct SET input of a flip-flop 95. The output ACCEA of the flip-flop 95 is sent to the interface logic network 10 and effectively starts the exchange of data handled by the network 10 between the RAM 4 and the unit 13.

The output RPMAO of the counter 80 and the output RPMBO of the counter 81 are activated when the addresses of the respective buffers return to zero after all the addresses present have been scanned: this corresponds to the full buffer condition. The signals RPMAO and ADR1O are applied as input to an AND element 92, while RPMBO and ADR1O are applied as input to an AND element 91. The outputs of the AND elements 91 and 92 are applied as input to the NOR element 93, which generates the signal RADIN. The signal RADIN is applied as input, together with the signal ECORN, to an AND element 94, which generates the signal REACN. REACN is applied to the direct RESET input of the flip-flop 95. The signal ECORN comes from the CPU 1 and serves to indicate the end of the connection of the control logic unit 13 with the interface logic network 10.

The operation of the arrangement for direct access to the RAM 4 by the disc unit 14 or vice versa will now be summarized briefly.

1. The CPU 1 encounters in the course of the program an INPUT-OUTPUT instruction (STIO) which requests the exchange of a block or blocks of data between the RAM 4 and the disc unit 14. This instruction comprises the information relating to:

initial address (in the RAM 4) of the transfer
the number of blocks each of 256 characters to be transferred
initial SECTOR address (on the disc) of the transfer.

The magnetic disc is divided into an integral number of SECTORS each of which is divided into a whole number of BURSTS, for example 16. Each burst has a fixed length equal to 16 characters. Each block comprises 256 characters divided into 16 bursts and occupies one SECTOR. The minimum transfer quantity is equal to one disc SECTOR, namely 16 bursts. Of course, this arrangement is purely indicative and not limitative.

2. The CPU 1 loads into auxiliary registers 12 (FIG. 1) the initial address in the RAM 4 of the transfer and the number of SECTORS required. It then sends to the control logic unit 13 the commands for positioning the magnetic head at the initial SECTOR concerned. By way of example, let us assume a transfer from the disc unit 14 to the RAM 4.

3. The control logic unit 13 loads the buffer A-stage 83 with the data read from the magnetic disc and sends the first character to be transferred together with the signal EPR1 to the CPU 1 by means of the channel 21.

4. The CPU 1 executes a microprogram which writes this character in the RAM 4 at the address stored in one of the auxiliary registers 12.

Figure 8:
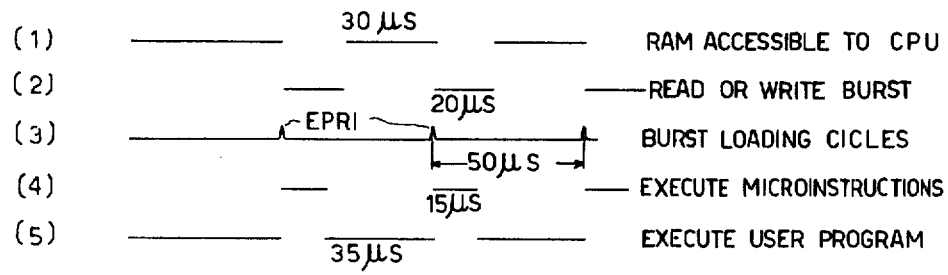
FIG. 8 is a time diagram relating to the time devoted by the various parts of the computer to the exchange of the blocks of data between the memory and the peripheral unit or vice versa.

The CPU 1 prepares the address in the RAM 4 at which is to be recorded the first character of the BURST which will be sent at the end of the transfer of the BURST in progress. If the last BURST is concerned, it concludes the connection with the control logic unit 13 by emitting the signal ECORO. This preparation takes place parallel with the following phases, as shown in FIG. 8.

5. The interface logic network 10 generates the signal ADRIN which constitutes the strobe signal for the unit 13 for the origination of a request for direct access (ACCEA) to the RAM 4.

6. ACCEA is staticized and synchronized by the flip-flop 45, which emits the signal ACD1O which determines a particular functioning of the RAM 4. This functioning consists in commanding successive cycles of the RAM 4 with increasing addresses. The RAM 4 remains engaged in relation to the CPU 1 because the signal TEABO is maintained at "1".

In the case of writing cycles, the data to be written is sent directly by the control logic unit 13 by means of the AI channel 15 and staticized in the interface register MIR-7 by the signal ADMAN.

In the case of reading cycles, the data read from the RAM 4 is extracted by the control logic unit 13 by the normal route of CPU 1 (NC channel 18 and channel 20) and is used on arrival of the signal ADELN generated by the interface logic network 10.

The operation of the arrangement will now be described in more detail, except that it is assumed that steps 1 and 2 above have been executed inasmuch as they do not concern the invention. On the other hand, all the following steps will be described in detail.

During the transfers of data from the disc unit 14 to the RAM 4, after the data read from the disc unit 4 has been parallelized it is carried by way of the channel 96 and the multiplexer 82 successively to the buffer A and B stages 83 and 84.

The addressing is supplied alternately by the counters 80 and 81, in which the addresses are incremented by means of the signal CARLO which is generated at each byte read from the disc unit 14 by the parallelizer 103.

If, on the other hand, the transfer of the data takes place from the RAM 4 to the disc unit 14, the addresses are generated either by the signal ECOT coming from the CPU 1 or by the signal ADELN coming from the interface logic network 10. It is to be noted that for either direction of transfer, the two data buffer stages 83 and 84 work alternately in reading and writing; that is, while one of them records the characters which are input, from the other there are simultaneously read the characters contained in it.

The characters read from one of the two buffer stages 83 and 84 are transferred through one of the channels 101 and 102 to the multiplexer 85 and thereafter by means of the channel 104 to the demultiplexer 86. The signals REMAN, REMBN, LEGEO and LEGRO establish the appropriate path of the characters read from the stage 83 or 84. The signal LEGEO moreover establishes whether the AI channel 15 and channel 21 or the channel 104 which connects the serializer 87 must be activated. In each case the transfer of the first character is effected through the CPU 1.

Figure 5:
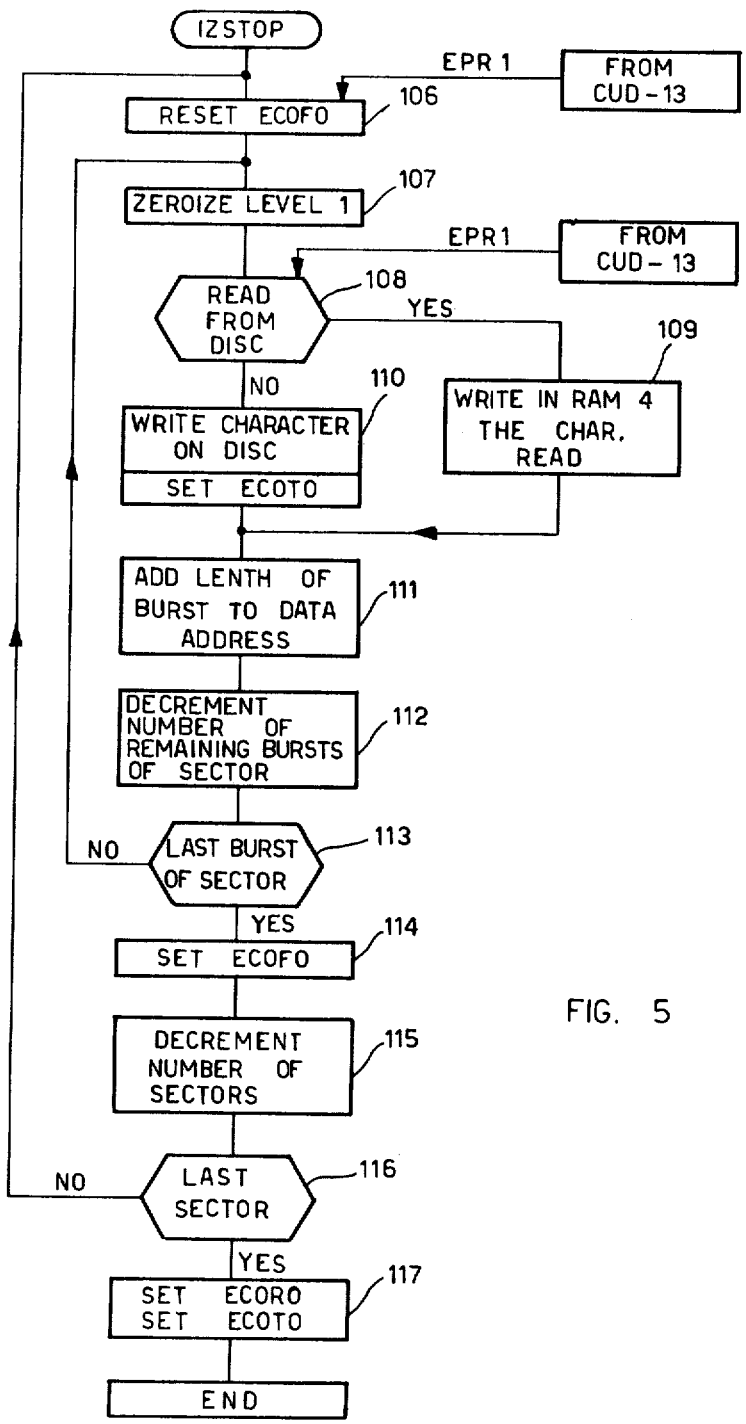
FIG. 5 is a flow diagram of the microprogram handling the transfer of the data from the memory to the peripheral unit or vice versa.

In order that this may happen, the control logic unit 13 emits the signal EPR1, which conditions the CPU 1 to interrupt the microprogram in progress and pass on to execute the microprogram handling the direct transfer, the flow diagram of which is given in FIG. 5. The signal EPR1 moreover indicates that this microprogram is executed with maximum priority and therefore cannot be interrupted. Block 106 puts to zero the signal ECOFO, which has the significance of end of connection by the CPU 1 when it is at level 1, and this block therefore constitutes an initialization. Block 107 puts the signal EPR1 to zero and therefore interrupts the execution of this microprogram of FIG. 5. The CPU 1 is ready to resume the execution of this microprogram at any instant, because the auxiliary registers 12 which it uses for executing it are allocated exclusively to this microprogram for the entire duration of the exchange.

On the arrival of another signal EPR1 from the control logic unit 13, the CPU 1 executes the logical decision 108 which examines the direction of the transfer. The block 110 will then be executed if the transfer is taking place in the direction from the RAM 4 to the disc unit 14, which records the first character of the BURST on the disc and emits the timing signal ECOTO. If the transfer is taking place from the disc unit 14 to the RAM 4, the block 109 is executed, which consists in recording the first character of the BURST in the RAM 4.

Then there is executed the block 11, which computes the initial address of the BURST following that in progress. In the example of the invention, this address is obtained by adding 16 to that used by the block 109 or 110.

The block 112 decrements the number of BURSTS which remain to be transferred within the limits of a SECTOR. Then there is executed the logical decision 113, which examines whether the decremented number in the preceding block is equal to zero or not. In the affirmative case, the block 114 is executed, otherwise a jump is executed to the block 107 which, as has been said, conditions the CPU 1 to execute an alternative microprogram of lower priority.

If, therefore, a sector (formed by 16 BURSTS in the present arrangement) has been transferred completely, the signal ECOFO (block 114) is emitted, which indicates this event to the control logic unit 13. The machine then goes on to execute the block 115, which decrements the number of sectors which must still be transferred. The logical decisison 116 that follows examines this number to check whether all the sectors have been transferred. In the event of this number being different from zero, a jump is executed to the block 106 and the operations described are repeated. On the other hand, if this number is zero, the block 117 is executed, thisblock concluding the transfer by setting the signals ECOTO and ECORO.

Returning now to the logical decision 108, this is executed on the arrival of the signal EPR1 coming from the control logic unit 13. During the execution of the following block 110 or 109, the CPU 1 executes the transfer of a character between the RAM 4 and the unit 13 or vice versa.

Figure 6A:
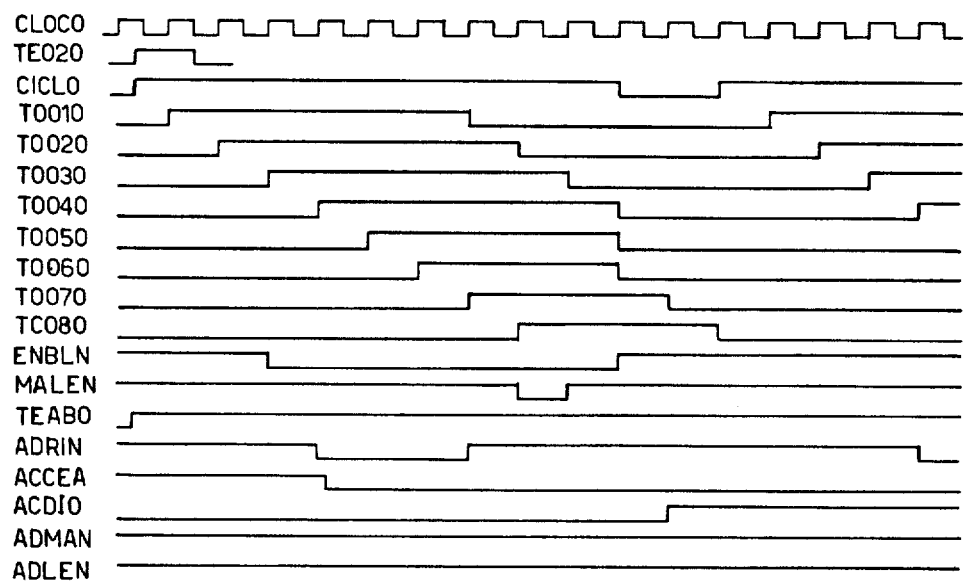
FIG. 6 is a time diagram of the signals involved in the transfer from the memory to the peripheral unit.
Figure 6B:
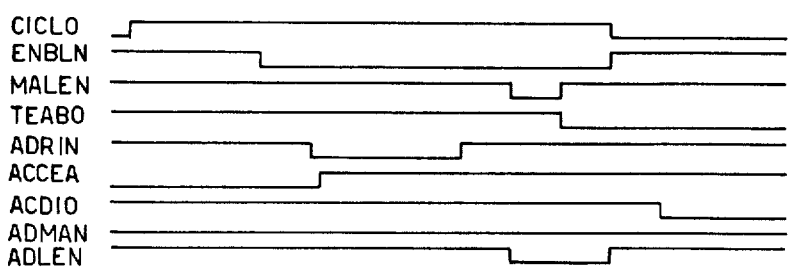
Figure 7A:
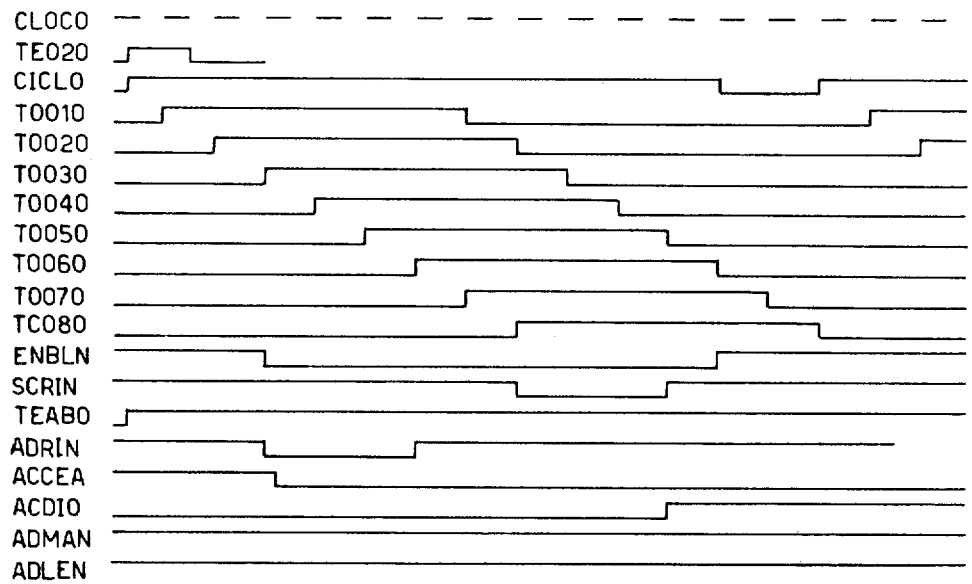
FIG. 7 is a time diagram of the signals involved in the transfer from the peripheral unit to the memory.

The signals characteristic of these transfers are shown in FIGS. 6a and 7a. It is apparent from these FIGS. that during the memory cycle (which lasts from one leading edge to the next of the signal CICLO) the NAND element 54 (FIG. 3) emits the signal ADRIN which urges the control logic unit 13 to emit the request for direct access to the RAM 4 by means of the signal ACCEA. In fact, it can be observed from FIG. 4 how the AND element 97 emits the signal SEACN which generates ACCEA. It is pointed out that the signal RICAO indicates that the CPU 1 has received the first character to be exchanged. The signal ACCEA (FIGS. 6b and 7b) persists throughout that phase of the exhange of characters which is controlled by the interface logic network 10.

Figure 7B:
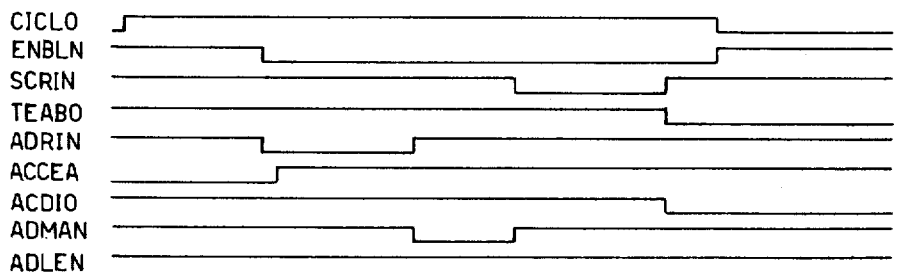

The signal TEABO is generated together with the signal CICLO and indicates to the CPU 1 that the memory is engaged: further cycles of the RAM 4 which are commanded by the CPU 1 will therefore not be accepted as long as TEABO persists. Of course, TEABO is reset at the end of the transfer of each BURST (FIGS. 6b and 7b).

The signal ACCEA sets the flip-flop 45, which emits the signal ACDIO. The signal ACDIO also persists during all the succeeding cycles of the RAM 4 and is reset at the end of the BURST. The function of ACDIO is to select the data which is input to the register MIR-7 (FIG. 2) and, in fact, in the first writing cycle in the RAM 4, ACDIN=0 (that is, ACDIO=1) loads the register MIR-7 with the character set by the CPU 1 on the NO channel 17, while in the following cycles commanded by the interface logic network 10 the signal ACDIN=1 loads the register MIR-7 with the character sent by the control logic unit 13 on the AI channel 15. The signal ACDIN via the NAND element 57, together with the timing of data from the CPU 1 effected by the signals CMCTO and TEO2O, supplies the signal MADAN. The AND element 58, having the signals MADAN and ADMAN as input (the latter indicates that a writing cycle is being executed in the RAM 4), generates the signal MADIN which staticizes the data in the input register MIR-7. The incrementing of the register MAR-6 is effected at each cycle of the RAM 4 by the signal MAINO generated by the AND element 47. The signal SCRIN (FIG. 7a) times the commmencement of the writing cycle of the RAM 4 and is generated by the NAND element 52, while the reading is timed by the signal MALEN (FIG. 6a) which is generated by the NAND element 53. The signals ADMAN and ADLEN are generated by the NAND elements 73 and 59, respectively, at the end of the writing cycle in the case of ADMAN and at the end of the reading cycle in the case of ADLEN. The signal ADELN, obtained from the OR function of ADMAN and ADLEN, is sent to the OR element 88 of the control logic unit 13 and supplies the signal NECO. The signal NECO is used to increment the addressing counters 80 and 81 of the buffer stages 83 and 84. Finally, at each memory cycle, the memory is enabled by the signal ENBLN.

A summary description of operation with particular respect to the times that the units making up the system devote to the exchange of the BURSTS of characters between the CPU 1 and the disc unit 14 or vice versa will now be given with reference to FIG. 8.

The time taken by the control logic unit 13 to load a BURST of 16 characters into the buffer stage 83 or into the buffer stage 84 is about 50 microseconds and is indicated by (3) in FIG. 8. Consequently, every 50 microseconds a signal EPRl which activates the block 108 of FIG. 5 is emitted.

The time taken by the CPU 1 to execute the microinstructions between the block 108 and the block 113 and to jump to the block 107 again is about 15 microseconds and is indicated by (4) in FIG. 8. This time is therefore the time used by the CPU 1 to handle the exchange of a BURST of 16 characters.

Simultaneously with the signal EPR1, the control logic unit 13 also emits the signal ACCEA which, as has been seen, conditions the interface logic network 10 to handle directly the exchange of a BURST of 16 characters between the RAM 4 and the unit 13 of vice versa.

The time taken by the network 10:

1. to record at successive addresses the 15 characters coming from the control logic unit 13 (it is pointed out that the first character of the BURST is always written in the RAM 4 by the CPU by means of the block 109 of FIG. 5) or
2. to read from the RAM 4 the 15 characters which complete a BURST, is about 20 microseconds and is indicated by (2) in FIG. 8.

Therefore, two operations are executed simultaneously:

1. the CPU 1 executes the writing or reading of the first character of the BURST in or from the RAM 4 and prearranges the next transfer (blocks 108 to 113);
2. the interface logic network 10 exchanges the remaining characters of the BURST, engaging the RAM 4 for 20 microseconds.

It has been said that the interval between two consecutive signals EPR1 (burst loaded into buffer stage 83 or 84) is 50 microseconds. It follows that about ⅕ of the time (15/50) of the CPU is devoted to the exchange of a BURST, while the remaining ⅘ are devoted by the CPU to the user program which the computer executes parallelly. This time is indicated by (5) in FIG. 8.

As regards the engagement of the memory, this devotes 20 microseconds, that is 2/5 of its time, to the exchange of a BURST (this time is indicated by (2) in FIG. 8), while for the remaining 3/5 it is at the disposal of the CPU 1 (this time is indicated by (1) in FIG. 8).

It is now evident how the arrangement illustrated permits the exchange of blocks of characters between the working memory of a computer and an external peripheral unit at the maximum speed permitted by the RAM 4. Moreover, from what has been said, it is apparent that by means of the use of a single special channel (the AI channel 15) and of a small added device (the interface logic network 10) it is possible to effect the exchange of blocks of characters taking up only ⅕ of the time of the central unit 1 at the maximum speed allowed by the disc unit 14.

From what has been said, it is clear that in the absence of the arrangement embodying the invention the exchange of the individual BURSTS must be handled by the CPU one character at a time by means of the consecutive execution of 16 character exchange microinstructions represented by the blocks 109 and 110 of FIG. 5. Consequently, the CPU uses 100% of its time to execute the exchange and must stop all other operations.

On the other hand, the arrangement embodying the invention enables the CPU to devote ⅘ of the duration of the exchange of characters for executing other operations. These operations may be not only of the type inside the CPU (computation), but also of exchange with the RAM 4, because as has been seen, for 3/5 of the time of BURST transfer the RAM 4 is available to the CPU 1.

What we claim is:

1. An electronic computer comprising:
   a working memory for recording instructions and data;
   a central processing unit for executing the instructions recorded in said memory, said instructions comprising input/output instructions;
   a peripheral unit for writing and reading information on a recording carrier; and
   a peripheral interface comprising:
   a control unit actuated by control signals generated by said processing unit by decoding said input/output instructions for controlling the transfer of sets of information characters of predefined length between said working memory and said peripheral unit, said control unit including a control circuit for generating a first command signal when a set of characters is ready to be transferred;
   a first channel for connecting said peripheral unit to said working memory by way of a connecting network including said central processing unit;
   a second channel for connecting said peripheral unit directly to said working memory;
   and switching means controlled by said control unit for transferring the first character of said sets over said first channel to the working memory and the remaining characters of the set over said second channel to said working memory, said switching means including means for connecting said first channel normally to said working memory and to actuate the connection of said second channel to said working memory.

2. A computer according to claim 1 wherein said a control unit including:
   a delay circuit controlled by said first command signal for generating a second command signal after the transfer of said first character over said first channel, and wherein said switching means are responsive to said second command signal for transferring the remaining characters of the set by means of the second channel.

3. A computer according to claim 2, wherein said control unit comprises:
   a buffer memory for recording at least two of said sets and selectively connectable to said peripheral unit or to said working memory over said first and second channels; and
   means for simultaneously controlling recording of a set of characters from said peripheral unit in said buffer memory and reading of the set previously recorded in said buffer memory.

4. A computer according to claim 3, wherein said control unit includes means for generating a signal for activating said buffer memory to initiate the exchange of one of said sets of characters between said working memory and said buffer memory.

5. A computer according to claim 2 further comprising:
   a register for addressing said working memory, and
   means responsive to the first command signal for incrementing the content of said addressing register during the transmission of said set of characters between said working memory and said buffer memory.

* * * * *